United States Patent
Malmberg

(10) Patent No.: US 8,066,126 B2
(45) Date of Patent: Nov. 29, 2011

(54) SCREENING ARRANGEMENT

(75) Inventor: Mats Malmberg, Rydsgård (SE)

(73) Assignee: Sandvik Intellectual Property AB, Sandviken (SE)

( * ) Notice: Subject to any disclaimer, the term of this patent is extended or adjusted under 35 U.S.C. 154(b) by 203 days.

(21) Appl. No.: 11/443,438

(22) Filed: May 31, 2006

(65) Prior Publication Data

US 2007/0000817 A1 Jan. 4, 2007

(30) Foreign Application Priority Data

May 31, 2005 (SE) ........................................ 0501232

(51) Int. Cl.
*B07B 1/49* (2006.01)
(52) U.S. Cl. ........................................ 209/399
(58) Field of Classification Search ................ 209/352, 209/400, 405, 397–399
See application file for complete search history.

(56) References Cited

U.S. PATENT DOCUMENTS

| | | | |
|---|---|---|---|
| 2,443,176 A | 6/1948 | Banning | |
| 4,269,704 A | 5/1981 | Bower, Jr. ..................... | 209/393 |
| 5,045,182 A | 9/1991 | Butler | |
| 5,087,351 A * | 2/1992 | Valentine, Sr. .................. | 209/20 |
| 5,614,094 A * | 3/1997 | Deister et al. .................. | 210/388 |
| 6,290,068 B1 * | 9/2001 | Adams et al. .................. | 209/401 |
| 6,302,276 B1 | 10/2001 | Seyffert et al. | |
| 6,450,345 B1 | 9/2002 | Adams et al. .................. | 209/399 |
| 6,607,080 B2 | 8/2003 | Winkler et al. | |
| 6,629,610 B1 * | 10/2003 | Adams et al. .................. | 209/399 |
| 2003/0042179 A1 * | 3/2003 | Adams et al. .................. | 209/408 |
| 2006/0037891 A1 * | 2/2006 | Lilie et al. ..................... | 209/397 |

FOREIGN PATENT DOCUMENTS

| | | |
|---|---|---|
| EP | 0 680 386 B1 | 7/1994 |
| GB | 181 941 | 6/1922 |
| JP | 8-89896 | 4/1996 |
| SE | 524 179 | 7/2004 |
| WO | 94/15724 | 7/1994 |
| WO | 01/45 867 | 6/2001 |
| WO | 02/078866 A2 | 10/2002 |

OTHER PUBLICATIONS

Patent Abstracts of Japan: vol. 1996 No. 08, Aug. 30, 1996, abstract & JP 8089896 A (Mitsuboshi Belting Ltd) Apr. 9, 1996.
Supplementary European Search Report mailed Apr. 27, 2009 issued in European Application No. 06733275.9.

* cited by examiner

*Primary Examiner* — Joseph C Rodriguez
*Assistant Examiner* — Kalyanavenkateshware Kumar
(74) *Attorney, Agent, or Firm* — Drinker Biddle & Reath LLP

(57) ABSTRACT

A screening arrangement in a vibrating screen for screening of material, such as crushed stone, gravel or the like. The screening arrangement is a cross-tensioned or longitudinally tensioned screening media including elements arranged on top of the screening media for stirring or mixing the screened material, the stirring elements being raised portions, which are arranged transversely to the travel direction of the screened material.

11 Claims, 4 Drawing Sheets

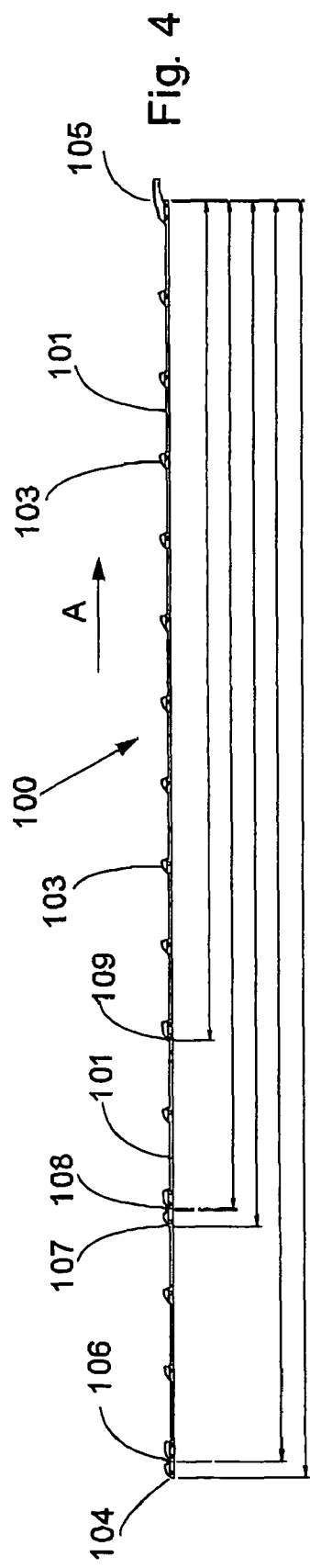
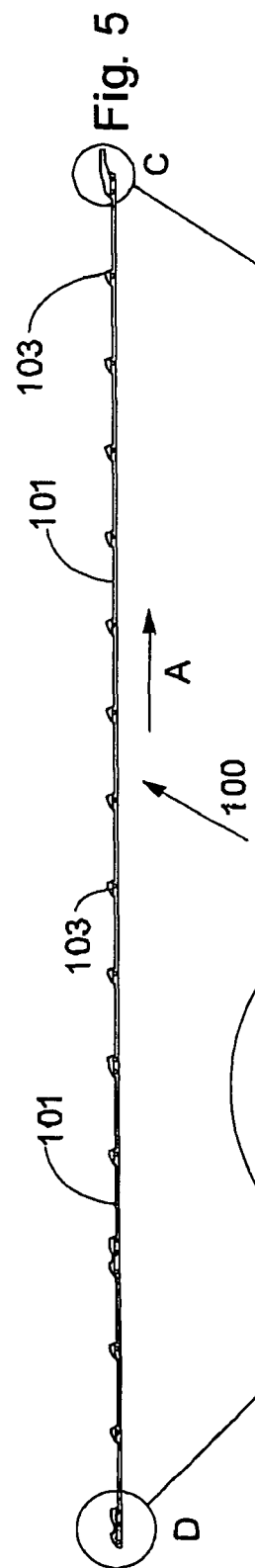
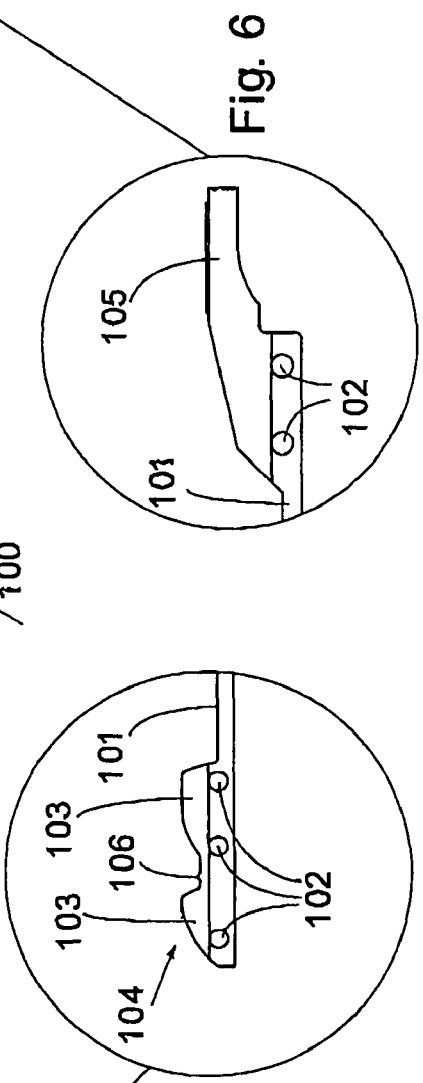

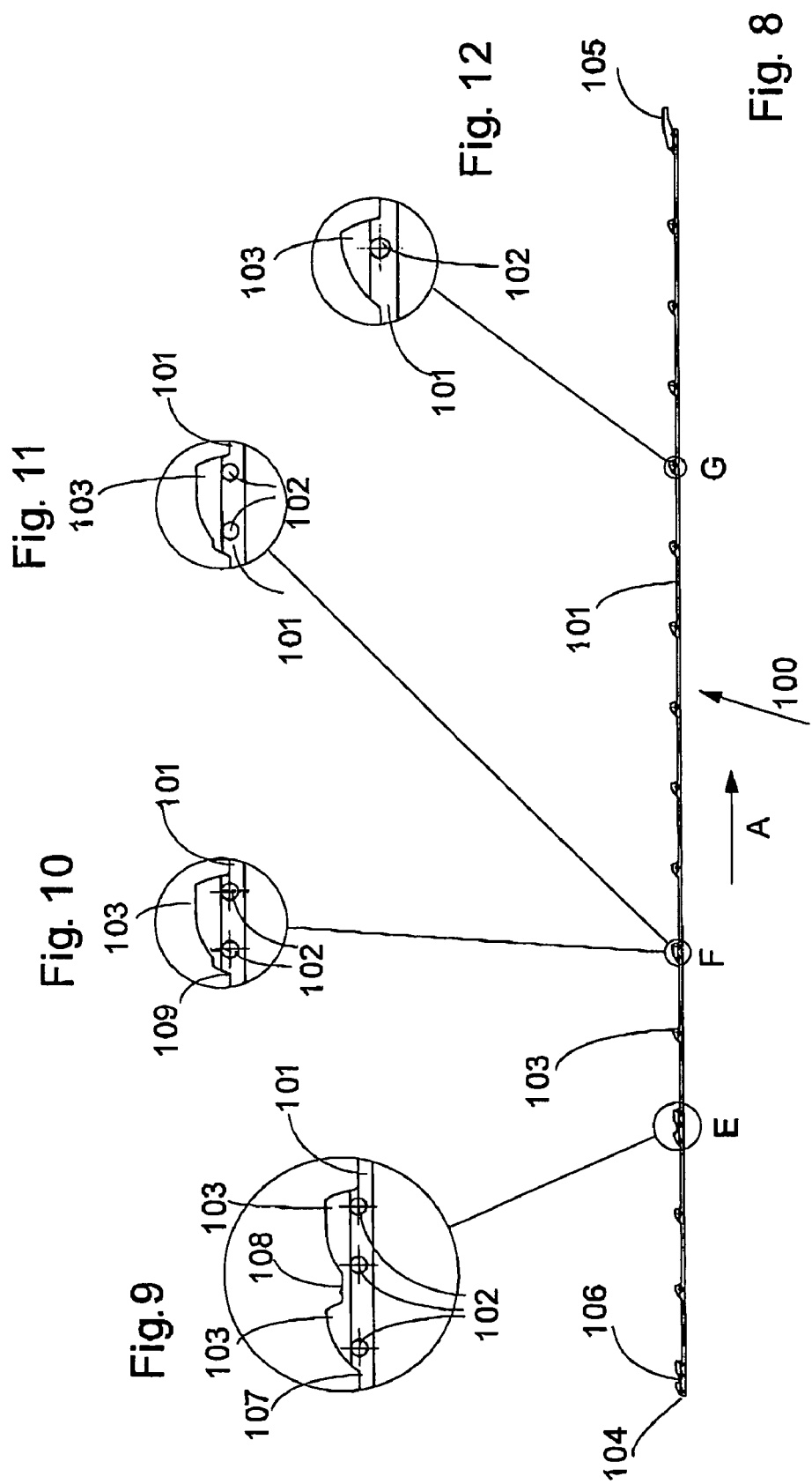

SCREENING ARRANGEMENT

FIELD OF THE INVENTION

The present invention relates to a screening arrangement in a vibrating screen for screening of material, such as crushed stone, gravel or the like. More particularly, the present invention relates to a screening arrangement being a cross-tensioned or a longitudinally tensioned screening media.

BACKGROUND

In mining and stone industries, it is in many cases important to fractionate crushed stone and gravel into fractions of stones with different sizes. Normally, a deviation from the size is permitted according to industry standards, e.g., 10 percent oversized particles and 15 percent undersized particles.

In most cases, fractionating is done by supplying an unfractionated stream of crushed stone or gravel to a vibrating screen provided with a screening deck including screening holes for allowing stones smaller than the screening holes to pass through the holes. The vibration pattern and the inclination of the vibrating screen are arranged so that the crushed stones continuously flow in one direction on the screen, ultimately leaving it on one side or falling through the holes in the screening deck.

To improve the screening of the unfractionated material and to get a thicker material layer on the screening deck some screening devices are provided with raised portions, see e.g., SE-C2-524 179 and EP-B1-0 680 386. In SE-C2-524 179, stiffening longitudinal beams are arranged on top of the screening deck to reduce the wear on the screening holes and to make undersized particles to pass faster through the screening deck. In EP-B1-0 680 386, a curved surface in the form of longitudinal ridges has been arranged on top of the screening deck, where the curved surface is a fine screening screen. The curved surface aims to provide a larger screening surface and to prevent material from being screened to migrate toward the lower sides of the screen.

Another application of a non-flat screening deck is disclosed in U.S. Pat. No. 6,607,080 and U.S. Pat. No. 6,629,610, where systems for separating particles from a mix of particles and fluids by a screen with shale shakers used in the drilling industry are shown. The screen is designed with a flat screening deck and with ramps so that a portion of the fluids will pass over the ramp, whereas the screen will separate the particles from the remaining portion containing both particles and fluid.

The problem with the above prior art solutions and screening devices having only a flat screening deck is that none of them reduces the traveling speed of the material to be stratified as it passes over the screening deck. Furthermore, they do not include elements for stirring or mixing the material to improve the screening.

Faced with the above prior art screening systems and the disadvantages and problems therewith, the object with the present invention is to provide a solution to improve screening efficiency in a simple way with a screening assembly for a vibrating screen for screening of unfractionated material, such as crushed stone and gravel.

SUMMARY

According to a first aspect, a screening arrangement in a vibrating screen for screening of material, the screening arrangement being a cross-tensioned or longitudinally tensioned screening media and comprising elements arranged on top of the screening media for stirring or mixing the screened material. The stirring elements being raised portions on the surface of the screening media, where the raised portions are arranged transversely to the travel direction of the screened material.

BRIEF DESCRIPTION OF THE DRAWINGS

In the following, the invention will be explained with reference to the accompanying drawings, wherein FIG. 4 is a side view of the screening media according to the invention showing shortening positions, FIG. 5 is a side view of the screening media according to the invention, FIGS. 6-7 show enlarged details C and D of the screening media of FIG. 5, FIG. 8 is a side view of the screening media according to the invention, FIGS. 9-12 show the enlarged details E, F and G of the screening media of FIG. 8.

DETAILED DESCRIPTION

Figure 1:
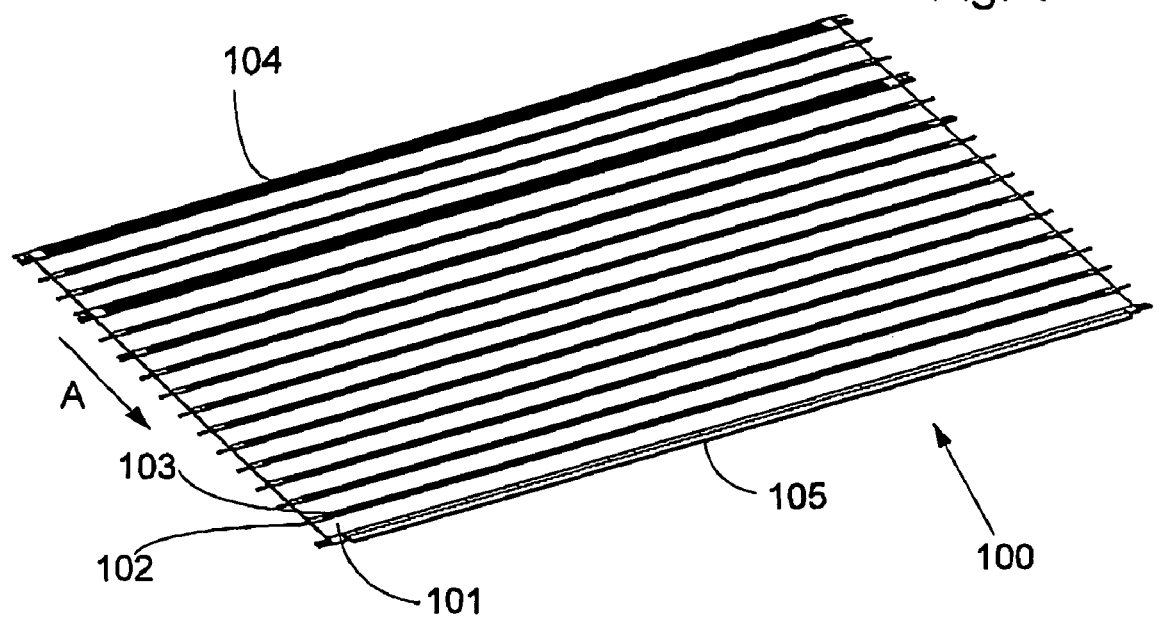
FIG. 1 is a schematic perspective assembly view of a screening media according to the invention.

FIG. 1 schematically shows a screening media 100 for a vibrating screen for screening of crushed stones, gravel or the like. The screening media 100 is a cross-tensioned screening media that is arranged in a vibrating screen by way of fastening arrangements 170 in each end of the screening media that fasten the screening media 100 to the walls 200 of the vibrating screen. The screening media 100 comprises a screening surface 101, wires 102 and raised portions 103.

The screening media 100 is further provided with a beginning portion 104 and an end portion 105. The beginning portion 104 defines the portion of the screening media 100, where the material to be screened enters the screening media 100. The end portion 105 defines the portion of the screening media 100, where the material leaves the screening media 100. A longitudinal direction of the screening media 100 is indicated with an arrow A in FIG. 1. The longitudinal direction of the screening media is also the traveling direction for the material, i.e. stones or gravel, on the vibrating screen.

Figure 2:
FIG. 2 is a front view of the screening media according to the invention.
Figure 3:
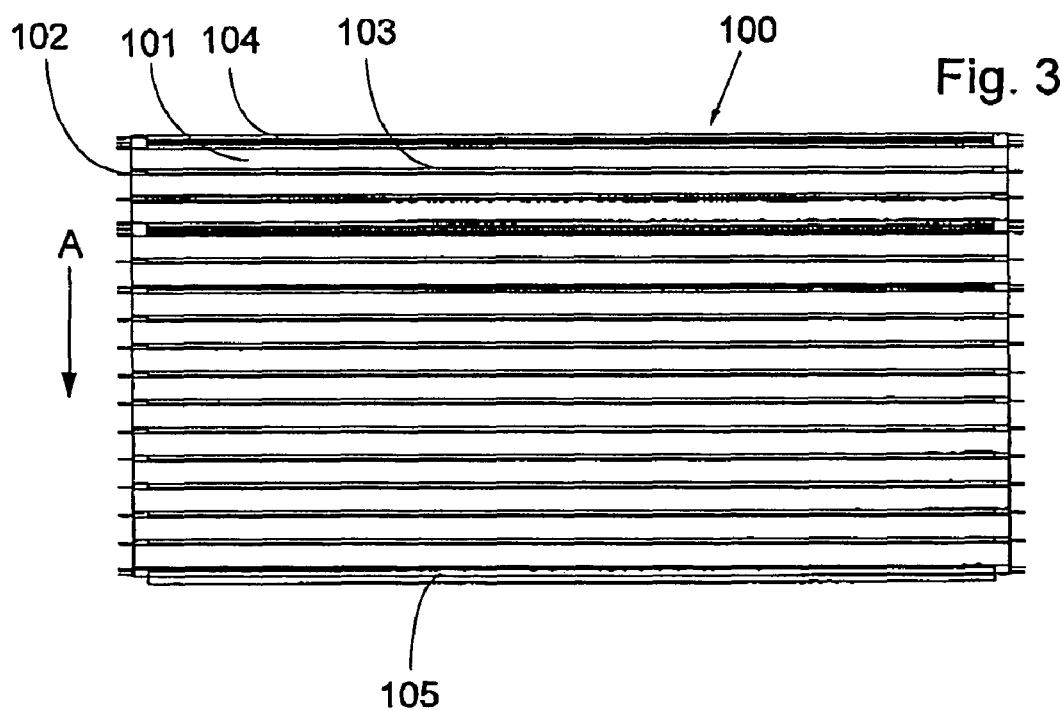
FIG. 3 is a top view of the screening media according to the invention.

FIG. 2 shows a front view of the screening media 100 having projecting wires 102 at each longitudinal side of the screening media 100. FIG. 3 shows a top view of the screening media 100. In both FIGS. 2 and 3, only a few of the wires 102 and the raised portions 103 are indicated, but it is obvious for a person skilled in the art that wires 102 and raised portions 103 are arranged at intervals from the beginning portion 104 and the end portion 105.

FIG. 4 shows a side view of the screening media 100 in its entire length. The screening media 100 comprises a screening surface 101, wires 102 and raised portions 103. The screening surface 101 is provided with through holes (not shown) for fractionating crushed stone and gravel into fractions of stones with different sizes.

The wires 102 and raised portions 103 are arranged perpendicular to the longitudinal direction of the screening media 100 and at a distance between each other along the entire length of the screening media 100. Between each raised portion 103, the screening surface 101 is arranged. At every raised portion 103, at least one wire 102 is arranged. The wires 102 are connected to an attaching device to fasten the screening media 100 to the walls of the vibrating screen.

To make the length of the screening media 100 flexible, the screening media 100 is provided with certain shortening positions 106-109, see FIG. 4, i.e. positions where the screening media 100 is prepared to be cut off. At the positions 106-109, several raised portions 103 can be arranged, where at least one of the raised portions 103 at the positions 106-109 is provided with two wires 102. If the screening media is shortened, the portion of the screening media left of the shortening positions 106-109 and the raised portion 103, having two wires 102 incorporated (as shown in FIGS. 7, 9 and 10), are cut off. Thus, the modified and shortened screening media has a new beginning portion defined by the raised portion 103 having two wires 102 incorporated at the cut-off position 106-109.

The raised portions 103 may have slightly different shapes as shown in FIGS. 7 and 9-12, but all shapes preferably have some common features, i.e. having a slightly increasing slope along the longitudinal direction of the screening media 100 to a top portion of the raised portion 103 and having a steep slope or almost a vertical end portion. The length, height, start portion and end portion of the raised portion 103 affect the stirring effect of the raised portion 103 and are selected to achieve the most effective stirring of the material to be screened. The shape of the raised portions 103 is also affected by the thickness of the screening surface. This is shown in FIG. 6, where the raised portion 103 is arranged on a plateau.

The raised portions 103 can also be arranged so that not every raised portion 103 has the same shape to create different stirring effects along the screening media. For example every second raised portion 103 may have the same shape, e.g., a higher shape, and those therein between may have another shape, e.g., a lower shape. The raised portions could also be arranged so that the raised portions 103, having two wires 102 incorporated are longer and lower, whereas the raised portions 103, having one wire 102 incorporated, are shorter and higher. In the shown embodiments, the raised portions 103, having two wires 102 incorporated are longer (see FIG. 7), whereas the raised portions 103, having one wire 102 incorporated, are shorter (see FIG. 7).

FIG. 6 shows an enlargement C of FIG. 5 of the end portion 105. FIG. 7 shows an enlargement D of FIG. 5 of the beginning portion 104. FIG. 9 shows an enlargement E of FIG. 8 of the screening media 100 including the shortening positions 107-108. FIGS. 10-11 show an enlargement F of FIG. 8 of the screening media 100 including the shortening position 109. FIG. 12 shows an enlargement G of FIG. 8 of a raised portion 103.

The screening media 100 comprises different materials. Both the screening surface 101 and the raised portions 103 are typically made of polymeric materials, e.g., polyurethane (PU) or rubber. Both the screening surface 101 and the raised portions 103 can be made of the same material, but in a preferred embodiment, the raised portions 103 are manufactured of relatively unresilient PU, whereas the screening surface 101 is manufactured of a more resilient PU. The preferred materials for the raised portions 103 have a hardness that preferably is in the range from about 50° Shore A to about 95° Shore A, and the preferred materials for the screening surface 101 have a hardness of about 30° Shore A to about 95° Shore A.

Preferred materials are, e.g., PU, rubber, PVC, polyethylene, polyamide, polyester, urethane rubber, suitable natural rubber compounds, other rubber materials or the like for both the raised portions 103 and the screening surface 101. The wires 102 are typically made of steel, Kevlar™, Twaron™, polyester or aramid fibers. The term "wire" has been used throughout the description and the appended claims with meaning of an arrangement having reinforcing and tensioning functionality and the "wires" are made of any of the above-disclosed materials.

The screening media can also be provided with wires at every second position of the raised portions, but not at the shortening positions. It also possible to have a screening media, where the raised portions are arranged at every second wire position.

The screening media can also be longitudinally tensioned, either by only rotating the screening media shown in e.g., FIG. 1 or by arranging the wires parallel with the longitudinal direction A of the screening media and arranging the spaced raised portions perpendicular to the longitudinal direction A.

Figure 13:
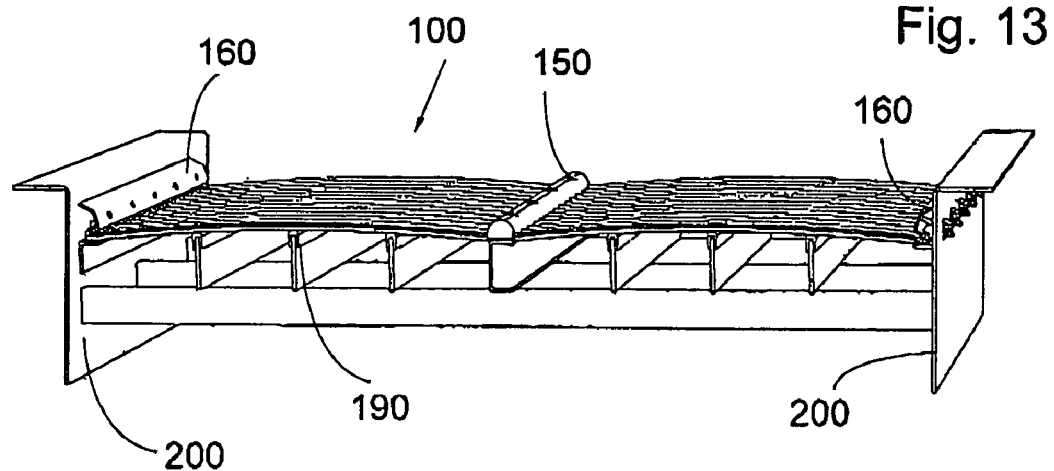
FIG. 13 is a perspective view of the screening media according to the invention as it is mounted in a screen.
Figure 14:
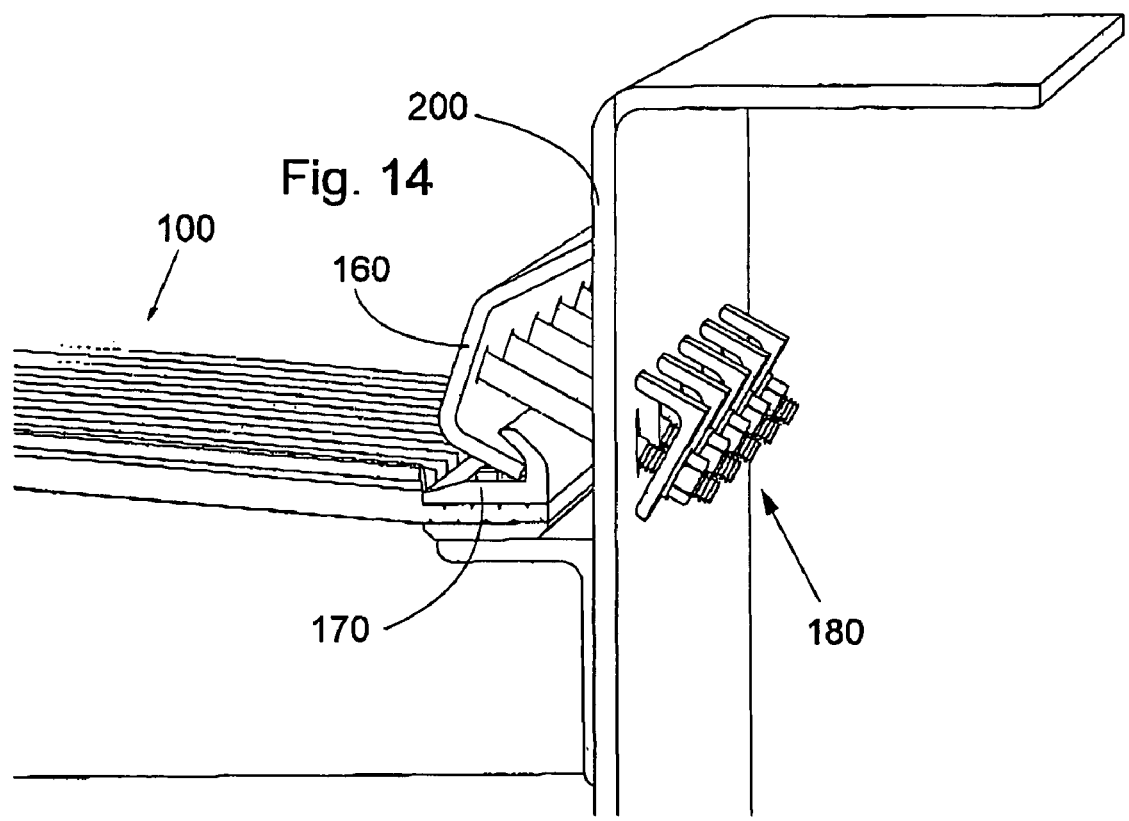
FIG. 14 is partial view of the arrangement of FIG. 13.

In FIG. 13 is shown screening media 100 that is mounted in a vibrating screen. The screening media 100 is attached to the sidewalls 200 of the vibrating screening by a hook arrangement 160, 170. Hooks 170 is arranged at the ends of the of the screening media 100, see FIG. 14, and corresponding and interacting hooks 160 are arranged on the sidewalls 200. The hooks 160 are provided with bolt and nuts arrangement 180 to tension the screening media 100 between the sidewalls 200 of the screen. The screen is further provided with support beams or barriers 190 between the sidewalls 200 of the vibrating screen having their longitudinal direction parallel to the sidewalls 200 of the vibrating screen. The support beams or barriers 190 are arranged at different heights in order to support the cross-tensioned screening media 100 between the sidewalls of the vibrating screen, forming the cross-tensioned screening media 100 to have a crowned or slightly upwardly curved shape and to support the cross-tensioned when being mounted.

In FIG. 13, a holding-down arrangement 150 is shown, which is used if the vibrating screens are very wide. The holding-down arrangement 150 is arranged with down holding element, e.g., longitudinal beam fixed by bolts or the like, for holding down the middle of the cross-tensioned screening media 100 so that the crowned shape is not too high, which eitherwise could cause the material to be screened to deviate to the sides giving a bad screening result. Thereby, two crowned shapes are arranged with the cross-tensioned screening media 100 over the width of the vibrating screen. In a narrower screen, the holding-down arrangement 150 is naturally omitted, since it is not needed.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A screening arrangement in a vibrating screen that screens material comprising:
    a cross-tensioned or longitudinally tensioned screening media having
        a longitudinal beginning portion,
        a longitudinal end portion opposite the longitudinal beginning portion, wherein the screened material enters at the longitudinal beginning portion,
        a travel direction of the screened material defined transversely to the longitudinal beginning portion and the longitudinal end portion, at least two sides extending transversely to the longitudinal beginning portion and the longitudinal end portion, and
a coupling at each of the at least two sides that secures the screening media; and
a plurality of raised portions arranged on a top surface of the screening media that stirs or mixes the screened material, each of the plurality of raised portions arranged transversely to the travel direction of the screened material, each of the plurality of raised portions including,
a first slope that rises along the travel direction of the screened material,
a top portion at a higher end of the first slope, and
a second slope steeper than the first slope that descends from the top portion.

2. The screening arrangement according to claim 1, wherein the plurality of raised portions and the screening media are made of the same material.

3. The screening arrangement according to claim 1, wherein the plurality of raised portions are made of a different material than the screening media.

4. The screening arrangement according to claim 1, wherein the plurality of raised portions are made of a material having different friction characteristics than a material of the screening media.

5. The screening arrangement according to claim 1, wherein the screening media further comprises a plurality of wires to cross-tension or longitudinally tension the screening media, each of plurality of wires extending between the at least two sides and parallel to at least one of the longitudinal beginning portion and the longitudinal end portion.

6. The screening arrangement according to claim 5, wherein each of the plurality of raised portions includes and is arranged on top of one of the plurality of wires.

7. The screening arrangement according to claim 5, wherein at least one of the plurality of raised portions includes and is arranged on top of at least two of the plurality of wires.

8. The screening arrangement according to claim 1, wherein at least one of the plurality of raised portions includes a shortening position to enable shortenings of the screening arrangement.

9. The screening arrangement according to claim 1, wherein the the plurality of raised portions include raised portions with different shape along the arrangement.

10. The screening arrangement according to claim 1, wherein a first group of the plurality of raised portions has a first shape and a second group of the plurality of raised portions has a second shape and each of the first group is arranged alternately with each of the second group along the arrangement.

11. A screening arrangement in a vibrating screen that screens material, comprising:
a cross-tensioned or longitudinally tensioned screening media having
a longitudinal beginning portion,
a longitudinal end portion opposite the longitudinal beginning portion, wherein the screened material enters at the longitudinal beginning portion,
a travel direction of the screened material defined transversely to the longitudinal beginning portion and the longitudinal end portion, and
a side extending transversely to the longitudinal beginning portion and the longitudinal end portion, and
a coupling at the side that secures the screening media; and
a plurality of raised portions arranged on a top surface of the screening media that stir or mix the screened material, the plurality of raised portions arranged transversely to the travel direction of the screened material, each of the plurality of raised portions including,
a first slope that rises along the travel direction of the screened material,
a top portion at a higher end of the first slope,
a second slope steeper than the first slope that descends from the top portion, and
at least one wire that extends from the side and is parallel to at least one of the longitudinal beginning portion and the longitudinal end portion.

* * * * *